(12) United States Patent
Alshawabkeh et al.

(10) Patent No.: US 11,375,012 B2
(45) Date of Patent: Jun. 28, 2022

(54) METHOD AND APPARATUS FOR DETERMINING FEATURE USAGE ON A SET OF STORAGE SYSTEMS DEPLOYED ACROSS MULTIPLE CUSTOMER SITES

(71) Applicant: EMC IP HOLDING COMPANY LLC, Hopkinton, MA (US)

(72) Inventors: Malak Alshawabkeh, Franklin, MA (US); William Smith-Vaniz, Maynard, MA (US); Sunil Gumaste, Bengaluru (IN)

(73) Assignee: Dell Products, L.P., Hopkinton, MA (US)

( * ) Notice: Subject to any disclaimer, the term of this patent is extended or adjusted under 35 U.S.C. 154(b) by 87 days.

(21) Appl. No.: 16/901,510

(22) Filed: Jun. 15, 2020

(65) Prior Publication Data

US 2021/0392186 A1    Dec. 16, 2021

(51) Int. Cl.
| | |
|---|---|
| *H04L 67/1097* | (2022.01) |
| *H04L 67/1004* | (2022.01) |
| *G06F 9/54* | (2006.01) |
| *G06N 20/00* | (2019.01) |
| *G06F 11/30* | (2006.01) |
| *G06F 16/21* | (2019.01) |
| *G06F 16/11* | (2019.01) |

(Continued)

(52) U.S. Cl.
CPC ............ *H04L 67/1097* (2013.01); *G06F 9/54* (2013.01); *G06F 11/3034* (2013.01); *G06F 11/3409* (2013.01); *G06F 16/128* (2019.01); *G06F 16/214* (2019.01); *G06K 9/6256* (2013.01); *G06N 20/00* (2019.01); *H04L 67/1004* (2013.01); *H04L 67/61* (2022.05)

(58) Field of Classification Search
CPC ............ H04L 67/1097; H04L 67/1004; H04L 67/322; G06N 20/00; G06F 16/214; G06F 16/128; G06F 9/54; G06F 11/3034; G06F 11/3409; G06K 9/6256
See application file for complete search history.

(56) References Cited

U.S. PATENT DOCUMENTS

| | | | |
|---|---|---|---|
| 8,484,351 B1* | 7/2013 | Dean ..................... | G06F 9/5083 709/226 |
| 8,494,894 B2* | 7/2013 | Jaster .................... | G06F 16/367 705/7.29 |

(Continued)

*Primary Examiner* — Ninos Donabed
(74) *Attorney, Agent, or Firm* — Anderson Gorecki LLP (57) ABSTRACT

A method of determining feature usage on a set of storage systems deployed across multiple customer sites includes defining metrics related to the features of interest, and pushing the defined metrics to an AIM (Autonomous Infrastructure Module) of an operating system of each storage system. The AIM on each storage system collects data associated with the metrics from the operating system on the storage system. The collected data is aggregated and formatted by the AIM and then used to create an autonomous field telemetry report. Autonomous field telemetry reports are periodically forwarded on a communication network to an analytics engine. The analytics engine parses each autonomous field telemetry report to extract usage information related to the features of interest, loads the parsed data to PostgreSQL staging and historical databases, and uses the parsed data alone or in combination with the historical data to create analytics and visualizations of the analytics.

17 Claims, 8 Drawing Sheets

(51) Int. Cl.
  *G06K 9/62* (2022.01)
  *G06F 11/34* (2006.01)
  *H04L 67/61* (2022.01)

(56) References Cited

U.S. PATENT DOCUMENTS

| | | | | |
|---|---|---|---|---|
| 9,384,227 | B1* | 7/2016 | Xiao | G06F 16/278 |
| 10,262,019 | B1* | 4/2019 | Reiner | G06F 9/5077 |
| 10,454,795 | B1* | 10/2019 | Jonsson | H04L 65/605 |
| 10,938,641 | B1* | 3/2021 | Fritz | H04L 41/0856 |
| 2005/0021306 | A1* | 1/2005 | Garcea | G06F 11/3447 |
| | | | | 702/186 |
| 2011/0129131 | A1* | 6/2011 | Avinash | G16H 50/20 |
| | | | | 382/128 |
| 2012/0078521 | A1* | 3/2012 | Avinash | G16H 50/70 |
| | | | | 702/19 |
| 2012/0174097 | A1* | 7/2012 | Levin | G06F 9/5077 |
| | | | | 718/1 |
| 2013/0121484 | A1* | 5/2013 | Elkington | H04M 3/5232 |
| | | | | 379/265.05 |
| 2013/0189944 | A1* | 7/2013 | McCoy | H04W 4/90 |
| | | | | 455/404.1 |
| 2013/0297475 | A1* | 11/2013 | Sen | G06Q 40/06 |
| | | | | 705/37 |
| 2014/0244343 | A1* | 8/2014 | Wilson | G06Q 10/0635 |
| | | | | 705/7.28 |
| 2014/0310243 | A1* | 10/2014 | McGee | G06F 16/27 |
| | | | | 707/639 |
| 2014/0372513 | A1* | 12/2014 | Jones | G06F 9/5072 |
| | | | | 709/203 |
| 2015/0149631 | A1* | 5/2015 | Lissack | H04L 43/16 |
| | | | | 709/226 |
| 2015/0281015 | A1* | 10/2015 | Griffith | G06F 11/3452 |
| | | | | 709/224 |
| 2015/0379424 | A1* | 12/2015 | Dirac | G06N 20/00 |
| | | | | 706/12 |
| 2016/0103970 | A1* | 4/2016 | Liu | G06Q 50/01 |
| | | | | 705/2 |
| 2016/0110406 | A1* | 4/2016 | Zircher | G06F 16/2365 |
| | | | | 707/690 |
| 2016/0188207 | A1* | 6/2016 | Choi | G06F 3/0644 |
| | | | | 711/153 |
| 2016/0373476 | A1* | 12/2016 | Dell'Anno | G06F 21/552 |
| 2017/0187496 | A1* | 6/2017 | Shalev | H04L 69/22 |
| 2017/0187621 | A1* | 6/2017 | Shalev | H04L 45/745 |
| 2017/0244658 | A1* | 8/2017 | Celone | H04L 51/063 |
| 2017/0264493 | A1* | 9/2017 | Cencini | H04L 67/1008 |
| 2018/0276628 | A1* | 9/2018 | Radiotis | G06F 16/23 |
| 2019/0149447 | A1* | 5/2019 | Hughes | H04L 41/22 |
| | | | | 370/244 |
| 2019/0158671 | A1* | 5/2019 | Feast | G06Q 10/0633 |
| 2019/0386891 | A1* | 12/2019 | Chitalia | H04L 41/22 |
| 2020/0125575 | A1* | 4/2020 | Ghoshal | G06V 10/40 |
| 2020/0328978 | A1* | 10/2020 | Gupta | H04L 47/20 |
| 2020/0334979 | A1* | 10/2020 | Gonçalves | G08G 1/0129 |
| 2020/0394455 | A1* | 12/2020 | Lee | G06K 9/6259 |
| 2021/0223864 | A1* | 7/2021 | Forsland | G06N 20/00 |
| 2022/0000448 | A1* | 1/2022 | Starns | A61B 8/4472 |

* cited by examiner

METHOD AND APPARATUS FOR DETERMINING FEATURE USAGE ON A SET OF STORAGE SYSTEMS DEPLOYED ACROSS MULTIPLE CUSTOMER SITES

FIELD

This disclosure relates to computing systems and related devices and methods, and, more particularly, to a method and apparatus for determining feature usage on a set of storage systems deployed across multiple customer sites.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method of determining feature usage on a set of storage systems deployed across multiple customer sites includes defining metrics related to the features of interest, and pushing the defined metrics to an autonomous infrastructure module of an operating system of each storage system. The autonomous infrastructure module on each storage system collects data associated with the metrics from the operating system on the storage system. The collected data is aggregated and formatted by the autonomous infrastructure module and then used to create an autonomous field telemetry report. Autonomous field telemetry reports are periodically forwarded on a communication network to an analytics engine. The analytics engine parses each autonomous field telemetry report to extract usage information related to the features of interest, loads the parsed data to PostgreSQL staging and historical databases, and uses the parsed data alone or in combination with the historical data to create analytics and visualizations of the analytics.

DETAILED DESCRIPTION

Aspects of the inventive concepts will be described as being implemented in connection with a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, and computer instructions that are stored on a non-transitory tangible computer-readable medium and implemented by multi-purpose tangible processors, and any combinations thereof.

Figure 1:
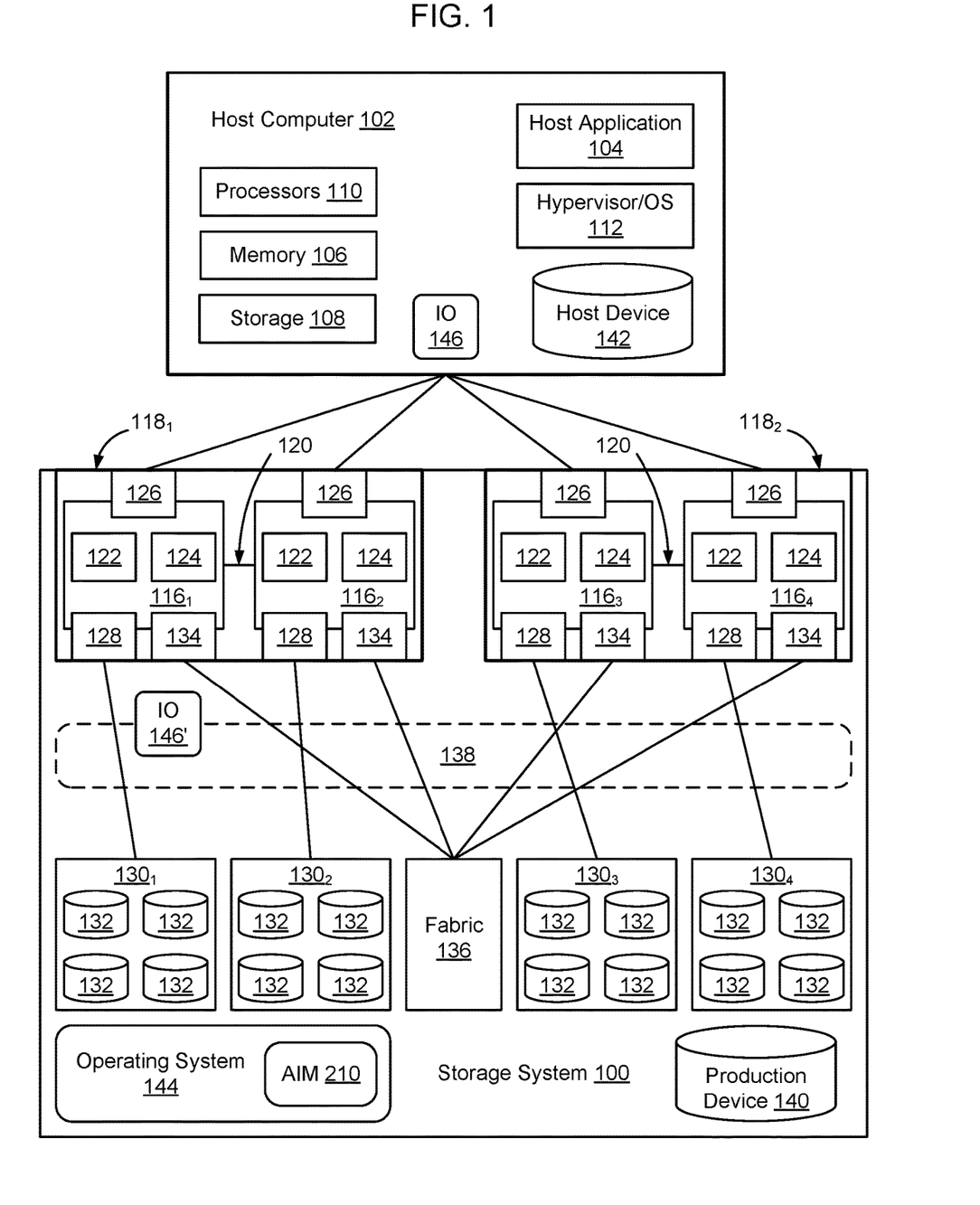
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example the host computer 102 is a server with volatile memory 106, persistent storage 108, one or more tangible processors 110, and a hypervisor or OS (Operating System) 112. The processors 110 may include one or more multi-core processors that include multiple CPUs, GPUs, and combinations thereof. The volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers, and although an external host computer 102 is illustrated, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$ using a PCIe bus, or may be connected to the compute nodes $116_1$-$116_4$, for example, by an IB (InfiniBand) bus or fabric.

In some embodiments, each compute node 116 also includes one or more CAs (Channel Adapters) 134 for communicating with other compute nodes 116 directly or via an interconnecting fabric 136. An example interconnecting fabric may be implemented using InfiniBand.

Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access).

The storage system 100 maintains data for the host applications 104 running on the host computer 102. For example, host application 104 may write host application data to the storage system 100 and read host application data from the storage system 100 in order to perform various functions. Examples of host applications 104 may include but are not limited to file servers, email servers, block servers, and databases.

Logical storage devices are created and presented to the host application 104 for storage of the host application data. For example, a production device 140 and a corresponding host device 142 are created to enable the storage system 100 to provide storage services to the host application 104. The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an IO (Input/Output command) 146 from the host application 104 to the host device 142, the hypervisor/OS 112 determines whether the IO 146 can be serviced by accessing the host computer memory 106. If that is not possible then the IO 146 is sent to one of the compute nodes 116 to be serviced by the storage system 100.

There may be multiple paths between the host computer 102 and the storage system 100, e.g. one path per front-end adapter 126. The paths may be selected based on a wide variety of techniques and algorithms including, for context and without limitation, performance and load balancing. In the case where IO 146 is a read command, the storage system 100 uses metadata to locate the commanded data, e.g. in the shared global memory 138 or on managed drives 132. If the commanded data is not in the shared global memory 138, then the data is temporarily copied into the shared global memory from the managed drives 132 and sent to the host application 104 via one of the compute nodes $116_1$-$116_4$. In the case where the IO 146 is a write command, in some embodiments the storage system 100 copies a block being written into the shared global memory 138, marks the data as dirty, and creates new metadata that maps the address of the data on the production device 140 to a location to which the block is written on the managed drives 132. The shared global memory 138 may enable the production device 140 to be reachable via all of the compute nodes $116_1$-$116_4$ and paths, although the storage system 100 can be configured to limit use of certain paths to certain production devices 140.

As shown in FIG. 1, storage system 100 has an operating system 144 which controls overall operation of storage system 100 and which has access to global memory 138. The storage system may also have numerous other components, such as one or more compression engines and various system applications running in emulations on one or more of the storage engines 118. Example system applications may include a snapshot application configured to create point in time copies of data stored in drive array 130, or may include a remote data forwarding application configured to enable the storage system 100 to participate in a remote mirroring pairing relationships with other storage systems at a geographically remote locations. There are numerous types of system applications that may be deployed on a particular storage system 100.

As is clear from FIG. 1, storage systems 100 are complex computer systems. To maintain these types of systems, it is necessary to determine how the storage systems are operating. For example, particular operational patterns may indicate that a particular storage system is misconfigured or that there is an imminent problem that should be addressed. Commonly, the company that produced the storage system 100 is also tasked with providing maintenance on the storage system in the form of software updates. The company that produced the storage system 100 may also develop new features or functionality that can be made available on new storage systems and on the set of existing deployed storage systems. To enable these functions to be performed more efficiently, it would be helpful to be able to determine what features of the storage systems are commonly used across the set of storage systems deployed at multiple customer sites, and to be able to compare particular usage patterns of a particular storage systems against normal usage patterns of other deployed storage systems. Unfortunately, this type of information conventionally doesn't exist. This means that an engineer, tasked with building a particular feature or capability, is unable to determine whether or to what extent that feature or capability is utilized once deployed on the deployed base of storage systems. This can impede future development and hinder creation of enhancements, because there is no visibility as to how the feature is being used and/or why the feature is not being used as extensively as expected.

As used herein, the term "telemetry data" is used to refer to statistical information associated with a workload that a particular storage system is handling. If a particular storage system is experiencing problems, a remote technician can look at the telemetry data of the particular storage system in connection with diagnosing the likely cause of the problem. However, this limited ability to see information about operational parameters associated with a particular storage system does not provide insight as to how all of the deployed storage systems are collectively operating. For example, an engineer that spent six months working on a particular new feature may want to collect information about whether that new feature is actually being used in the deployed set of storage systems owned by customers throughout the world. Unfortunately, this type of information is not readily available.

In some embodiments, more than just reporting, a new system is proposed, referred to herein as an AAA (Autonomous Advanced Analytics) system 200, that enables the storage system engineers to autonomously or semi-autonomously examine field telemetry data of deployed storage systems using sophisticated constructed internal code metrics and statistics defined by microcode engineers. Currently, there are no existing useful data source that can help:

evaluate the benefit of shipped functionalities/features and their usage by customers like answering the question of how useful dedupe is?;

provide insights for future design decisions, such as providing insight as to what is the best V4 cache slot layout based on customer workload history, or what the future compression rates of mainframe systems will be;

easily triage customer boxes using the analytics engine to dynamically generate reports and dashboards to assist with root cause analysis, e.g. to help find unhealthy storage systems, overly full or bad drives, or thrashing issues;

debug in-house arrays and perform bug detection—data anomalies can indicate code bugs in fixes; and get knowledge of unique customer environments that can improve testing efforts.

In some embodiments, the autonomous advanced analytics system 200 can support discover deeper insights, make predictions, and/or generate recommendations using advanced analytic techniques includes using machine learning, pattern matching, and creates visualizations of the feature usage. This enables both "optimization" to support the improvement of existing processes, and "innovation" to highlight potential new products and services.

Figure 2:
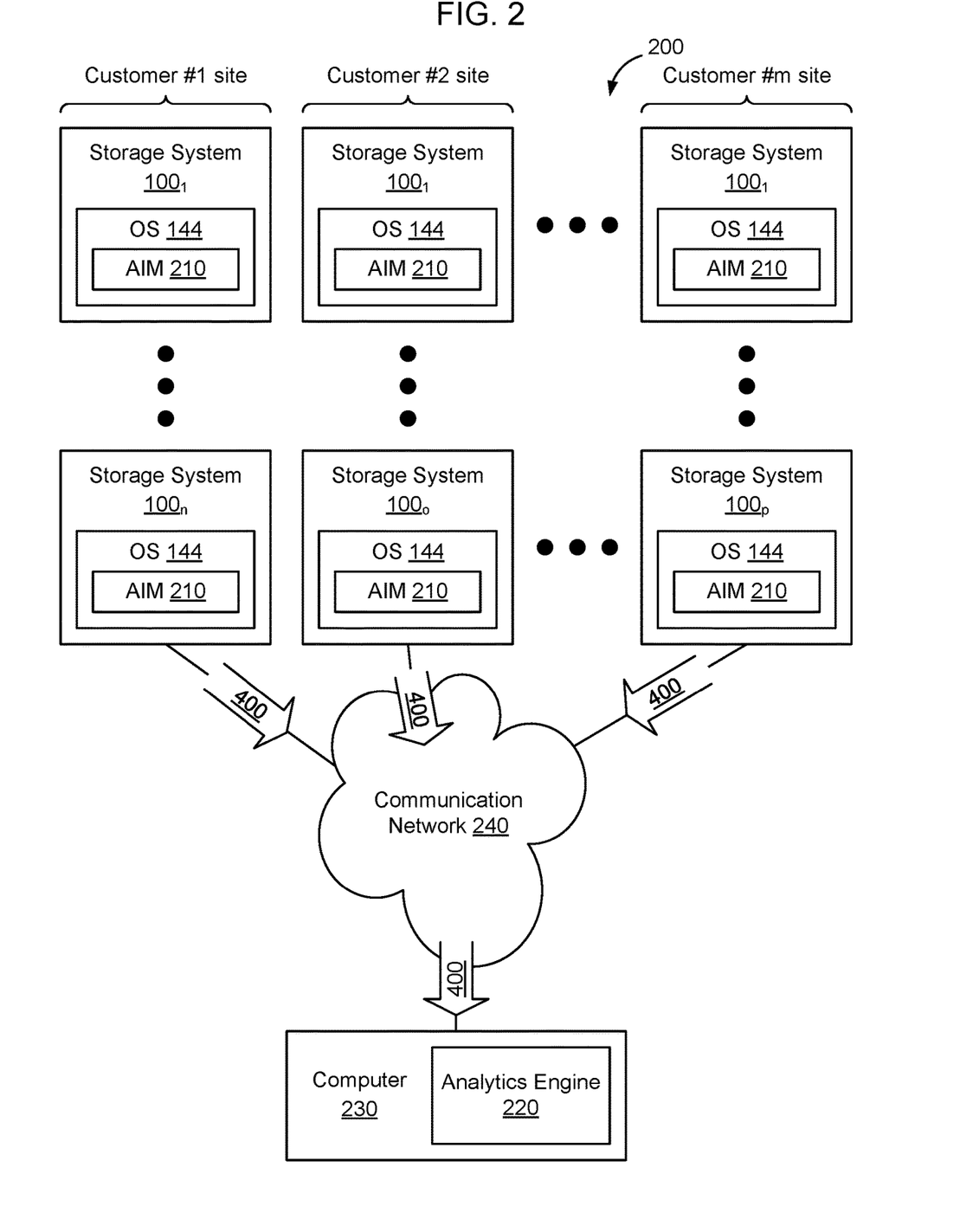
FIG. 2 is a functional block diagram of an example set of storage systems deployed at multiple customer sites, each storage system having an autonomous infrastructure module to collect information relative to usage of features of the respective storage system and generate autonomous field telemetry reports, according to some embodiments.

FIG. 2 is a functional block diagram of an example set of storage systems $100_1$-$100_n$ deployed at multiple customer sites, each storage system having an autonomous infrastructure module 210 to collect information relative to usage of features of the respective storage system 100 and generate autonomous field telemetry reports 400, according to some embodiments.

As shown in FIG. 2, in some embodiments autonomous advanced analytics system 200 includes an AIM (Autonomous Infrastructure Module) 210 on each storage system 100 and an analytics engine 220 running on a computer 230. Computer 230, in some embodiments, is implemented as host computer 102. Each autonomous infrastructure module 210 communicates with the analytics engine 220 using autonomous field telemetry reports 400 that are sent to analytics engine 220 on computer 230 via a communication network 240 such as the Internet. The analytics engine 220 can also send instructions to the autonomous infrastructure modules 210 to adjust the type of information collected and the type of information synthesized by the autonomous infrastructure modules 210.

In some embodiments, each autonomous infrastructure module 210 is installed in the operating system of a respective storage system 100 produced by a particular storage system manufacturer. For example, as shown in FIG. 2, a given storage system manufacturer may manufacture multiple types of storage systems 100 and sell them to multiple customers. Each storage system 100 has an operating system 144 that controls access to global memory 138 of the storage system 100, although not all operating systems on all storage systems are identical. Since the autonomous infrastructure module 210 has access through the operating system 144 to usage information of global memory 138, the autonomous infrastructure module 210 is able to collect information about how features of the storage system 100 are being used.

In some embodiments, the autonomous infrastructure module 210 on each storage system 100 is configured to collect statistical information about telemetry data, feature usage data, and other operational parameters of the storage systems 100. The particular type of data to be collected can be adjusted over time, for example as new features and capabilities are created and added to the storage systems 100, or to gain insight to operational characteristics of existing system features and capabilities. The autonomous infrastructure module 210 synthesizes information gleaned from telemetry data associated with operation of the storage system and feature usage and generates autonomous field telemetry reports 400. Autonomous field telemetry reports 400 are forwarded on communication network 240 to an analytics engine 220 running on a computer 230. Additional information associated with autonomous infrastructure module 210 is set forth below in connection with FIG. 3. Additional information associated with analytics engine 220 is set forth below in connection with FIGS. 4-7.

No existing sophisticated data source, even the storage systems 100 themselves, can assist storage system engineers (mainly developers) to examine their own functionalities and triage customer issues with ease. Using the scalable autonomous infrastructure module 210 built-in the storage system OS 144, an ad hoc capability is provided to store engineers defined metrics in the storage system's integrated AI SQLite DB, and then daily autonomous field telemetry reports 400 are collected and sent home to the analytics engine 220. With minimal overhead the data processing system of the analytics engine 220 parses the autonomous field telemetry reports 400 and loads the parsed autonomous field telemetry reports 400 into a dedicated Postgres DB 425. New autonomous field telemetry reports 400 and changes to existing autonomous field telemetry reports 400 can arrive and be processed without code revisions or configuration changes, and a new autonomous field telemetry report 400 can be added in the field and it will be parsed and loaded into the Postgres DB within days—where new database tables and attributes are created as needed to accommodate new autonomous field telemetry reports 400. An analytics dashboard application 445 provides a data processing and visualization tool for engineers and future support for advanced analytics. In some embodiments, the analytics dashboard application 445 can connect to multiple data sources such as SYR and SQLite DB files or any new defined data source.

In some embodiments, by collecting such powerful data, it is possible to not only helps gauge customer needs and satisfaction, but can also be used to generate additional business by identifying storage systems that are overworked or would work more efficiently if provided with a particular upgrade. In some embodiments, the autonomous advanced analytics system 200 can be used to:

enable developers to debug their functionality in-house or easily triage customer systems in the field;

provide insights to developers to evaluate their functionality usage by customers;

offer knowledge of unique customer environments that can improve testing efforts; and allow data to be modeled for predictive analysis to show customers the advantage/improvement that the particular feature/functionality has delivered.

Figure 3:
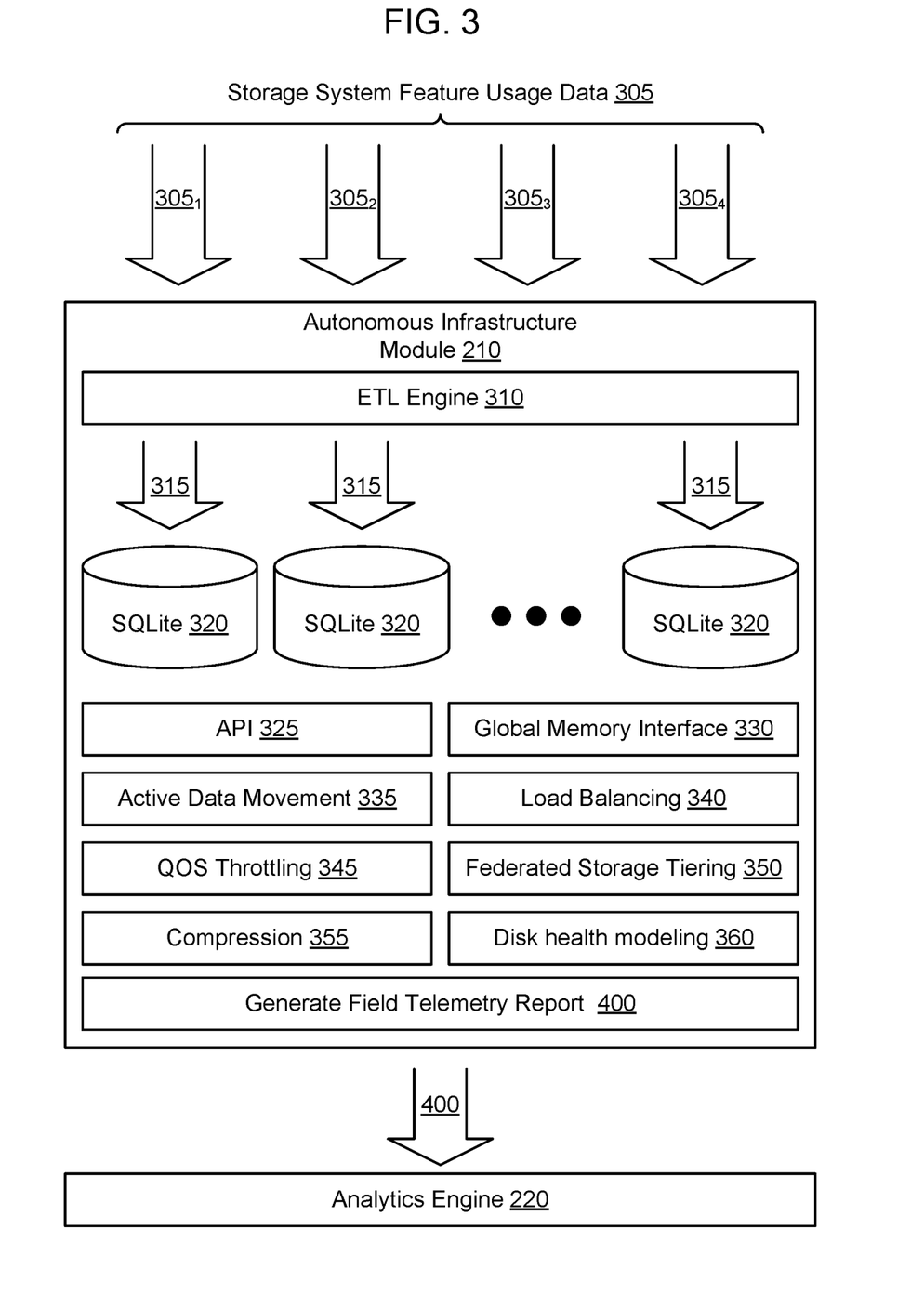
FIG. 3 is a functional block diagram of an example autonomous infrastructure module, according to some embodiments.

FIG. 3 is a functional block diagram of an example autonomous infrastructure module 210, according to some embodiments. As shown in FIG. 3, in some embodiments the autonomous infrastructure module 210 has an API (Application Programming Interface) 325 that enables metrics to be defined to cause the autonomous infrastructure module 210 to identify and collect information about operations on global memory 138 by operating system 144. The API 325 enables a storage system engineer to specify the type of operations on global memory 138 that are of interest, so that the type of operation of the storage system 100 is able to be dynamically defined. For example, a virtual provisioning team may define a custom metric to determine the benefit of using compression/data reduction/or deduplication. A cache team may define a metric that will enable the cache slot allocation speed, minimum/maximum cache usage and fallthrough time parameters to be measured on the storage system. A remote replication team may define metrics to determine the number of snapshots taken on particular filesystems. Likewise, customer support may use the API 325 to define metrics useful for customer support and performing triage, such as workload skew and system performance. Numerous different metrics may be specified using API 325 and these are only a few such examples.

In some embodiments, the autonomous infrastructure module 210 includes a global memory interface 330 that enables the autonomous infrastructure module 210 to receive information from the OS 144 about operations on global memory 138. Using global memory interface 330, the autonomous infrastructure module 210 receives storage system performance and feature usage data 305 based on field telemetry data and processes this data using the metrics defined using API 325. Example storage system performance and feature usage data 305 may include system configuration information $305_1$, heatmaps indicating the presence of frequently accessed data $305_2$, media performance information $305_3$ identifying the throughput, responsiveness, and bandwidth of various components of the storage system 100, and storage group performance information $305_4$. Other types of performance and feature usage data 305 may be collected as well, and these are simply some examples of types of data that may be collected by the autonomous infrastructure module 210.

In some embodiments, the autonomous infrastructure module 210 includes an ETL (Extract Transform Load) engine 310 configured to receive the storage system performance and feature usage data 305 throughout the day and use the received storage system performance and feature usage data 305 to update one or more SQLite databases 320. Where there is more than one SQLite database 320, the workload of the ETL engine 310 can be distributed between the SQLite databases 320 by causing particular aspects of the storage system performance and feature usage data 305 to be stored in particular SQLite databases, or by distributing workload across a set of CPUs assigned to process the storage system performance and feature usage data 305. In some embodiments, the number of SQLite databases 320 scales dynamically with the size of the storage system 100, and may be implemented using one or more production devices 140.

In some embodiments, the data that is added to the SQLite databases 320 is aggregated for global feedback to the analytics engine 220 using one or more aggregation modules 335-360. In some embodiments, the aggregation modules 335-360 of autonomous infrastructure module 210 includes processes configured to monitor for particular aspects of telemetry data (metrics) that are defined via API 325, and are configured to aggregate particular aspects of the telemetry data 305. Although a set of example aggregation modules 335-360 is shown in FIG. 3, the API 325 can be used to define multiple types of operations that should be aggregated and reported, and used to create additional modules as new features and capabilities are deployed in the storage system 100. Likewise, some embodiments may not use all of the described modules (335-360). Accordingly, the particular selection of modules will depend on the particular implementation.

In some embodiments, the aggregation modules 335-360 are machine learning models trained to look for particular patterns in the telemetry data associated with the features of interest.

In the example shown in FIG. 3, the autonomous infrastructure module 210 includes an active data movement aggregation module 335 configured to monitor for and aggregate operations of the storage system that are associated with active movement of data by the storage system, such as in connection with creation of snapshots or mirroring of data between arrays.

In some embodiments, the autonomous infrastructure module 210 includes a load balancing module 340 configured to monitor for and aggregate operations of the storage system associated with load balancing operations of the storage system between storage engines, storage arrays, CPUs, and other physical components of the storage system 100.

In some embodiments, the autonomous infrastructure module 210 includes a QOS throttling aggregation module 345 configured to monitor for and aggregate operations of the storage system associated with QOS throttling.

In some embodiments, the autonomous infrastructure module 210 includes a federated storage tiering module 350 configured to monitor for and aggregate operations of the storage system associated with movement of data between tiers of storage in a tiered storage system.

In some embodiments, the autonomous infrastructure module 210 includes a compression module 355 configured to monitor for and aggregate operations of the storage system associated with use of compression in connection with storage operations.

In some embodiments, the autonomous infrastructure module 210 includes a disk health modeling module 360 configured to monitor for and aggregate operations of the storage system associated with disk health parameters.

By aggregating data and summarizing the operational parameters and feature usage information of the storage system 100, as detected by operations on global memory 138 using global memory interface 330, it is possible to generate a summary of the telemetry data without requiring the actual telemetry data to be transmitted outside the storage system. These summaries, in some embodiments are forwarded to the analytics engine 220 using the autonomous field telemetry reports 400.

Aggregating the telemetry data and feature usage information into autonomous field telemetry reports 400 has several advantages. First, a given storage system 100 may process millions of IO operations per hour. Transmitting information about the raw telemetry data would therefore be extremely bandwidth intensive. Further, at the analytics engine 220, if each storage system 100 transmitted its telemetry data to the analytics engine 220, the analytics engine would be required to process (e.g. aggregate) a huge amount of data. For example, if there are 10000 deployed storage systems 100, and each storage engine had 1 million IOs in in a given reporting period, if the raw telemetry data was passed back to the analytics engine 220 the analytics engine 220 would be required to process 10 trillion IO operations, while keeping track of which IO operations occurred on each storage system 100. Processing such an enormous amount of information would computationally and memory intensive.

By using aggregation modules 335-360 in each autonomous infrastructure module 210 on each storage system 100 to locally aggregate different aspects of the telemetry data and feature usage information of a given storage system 100, and generate autonomous field telemetry reports 400 containing this aggregated information, it is possible to distribute processing of the telemetry data to the storage systems 100 such that the telemetry data is able to be processed in parallel locally by each storage system. By processing the data locally, the overall burden on the analytics engine 220 is reduced and the amount of bandwidth required to communicate between the autonomous infrastructure modules 210 and the analytics engine 220 on communication network 230 is dramatically reduced. This also has the added benefit of also having each of the storage systems 100 process its own telemetry data internally, which is less of a security risk than making the telemetry data available outside of the storage system.

Figure 4:
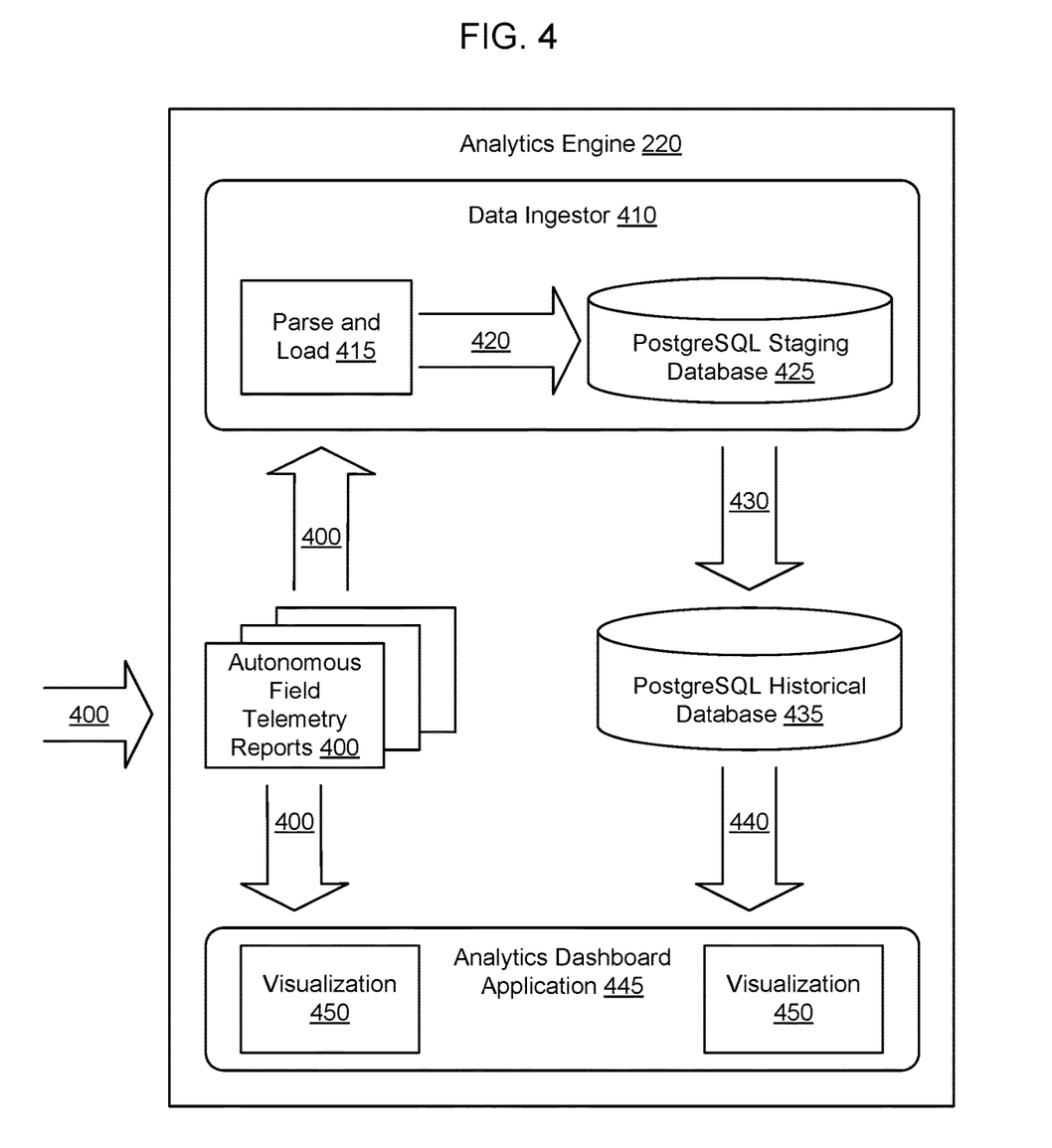
FIG. 4 is a functional block diagram of an example analytics engine, according to some embodiments.

FIG. 4 is a functional block diagram of an example analytics engine 220, according to some embodiments. As shown in FIG. 4, in some embodiments the analytics engine 220 receives autonomous field telemetry reports 400 from each of the storage systems 100 and passes the autonomous field telemetry reports 400 to a data ingestor 410. In some embodiments the process of receiving the autonomous field telemetry reports 400 and passing them to the data ingestor 410 is implemented using ESRS (External Secure Remote Services) infrastructure, which is a connection between storage systems 100 and a customer service platform that is configured to enable the customer service platform to receive failure notices and work requests when storage systems 100 require service.

In some embodiments the data ingestor 410 has a parse and load engine 415 configured to receive the autonomous field telemetry reports 400, parse the data contained in the autonomous field telemetry reports 400 to create parsed autonomous field telemetry reports 420, and load the parsed autonomous field telemetry reports 420 to a PostgreSQL Staging Database 425. In some embodiments, the parsed autonomous field telemetry reports are loaded to the PostgreSQL Staging Database 425 using a CIFS (Common Internet File System) mount process.

Figure 5:
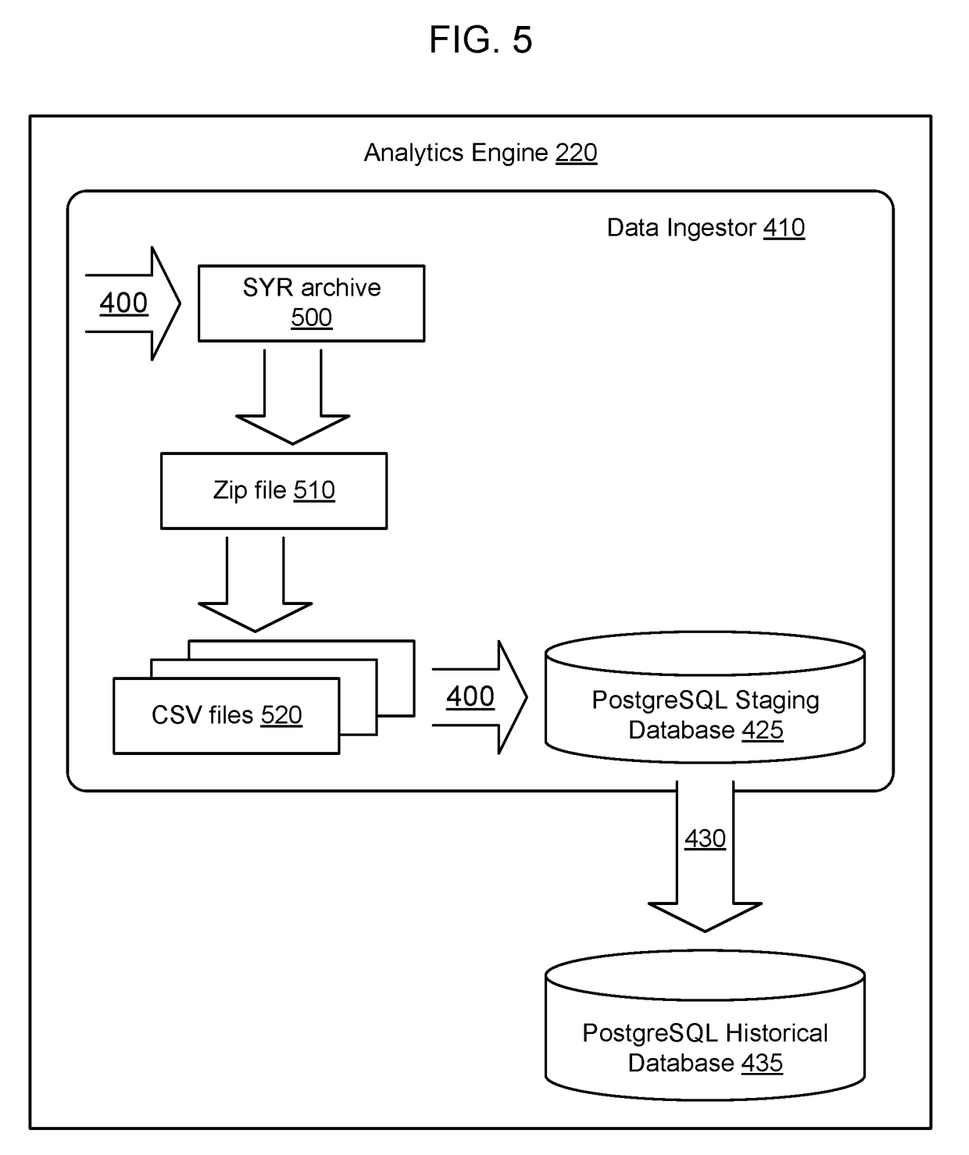
FIG. 5 is a functional block diagram showing data intake aspects of the analytics engine of FIG. 4 in greater detail, according to some embodiments.

FIG. 5 is a functional block diagram showing data intake aspects of the analytics engine of FIG. 4 in greater detail, according to some embodiments. As shown in FIG. 5, in some embodiments the data ingestor 410 has a SYR archive 500 configured to receive and store the autonomous field telemetry reports 400. Each autonomous field telemetry reports 400 is used to create a ZIP file 510 which is used to create one or more CSV (Comma Separated Value) files 520. The CSV files are loaded to the PostgreSQL staging database 425.

In some embodiments, the data ingestor 410 coordinates data batch loads so that multiple jobs can run in parallel without contention. It automatically parses the data contents from the CSV formatted files 520, and loads the data into the PostgreSQL database 425. In some embodiments, the loading process is configured to automatically accommodate changes in CSV report files, such that a previously unknown report can be loaded, a report that has a new column can be loaded, a report with a missing column can be loaded, and reports with different column orders can be loaded. This flexibility enables reports with many different formats to be entered into a common PostgreSQL database to enable flexibility in the manner in which the data is collected by the AIMs 200 and included in reports 400.

Parsed autonomous field telemetry reports 420 are incrementally loaded to a PostgreSQL historical database 435 where they are stored for subsequent analysis by an analytics dashboard application 445. As shown in FIG. 4, in some embodiments the analytics dashboard application can also receive the autonomous field telemetry reports 400 directly upon arrival at analytics engine depending on the embodiment.

Figure 6:
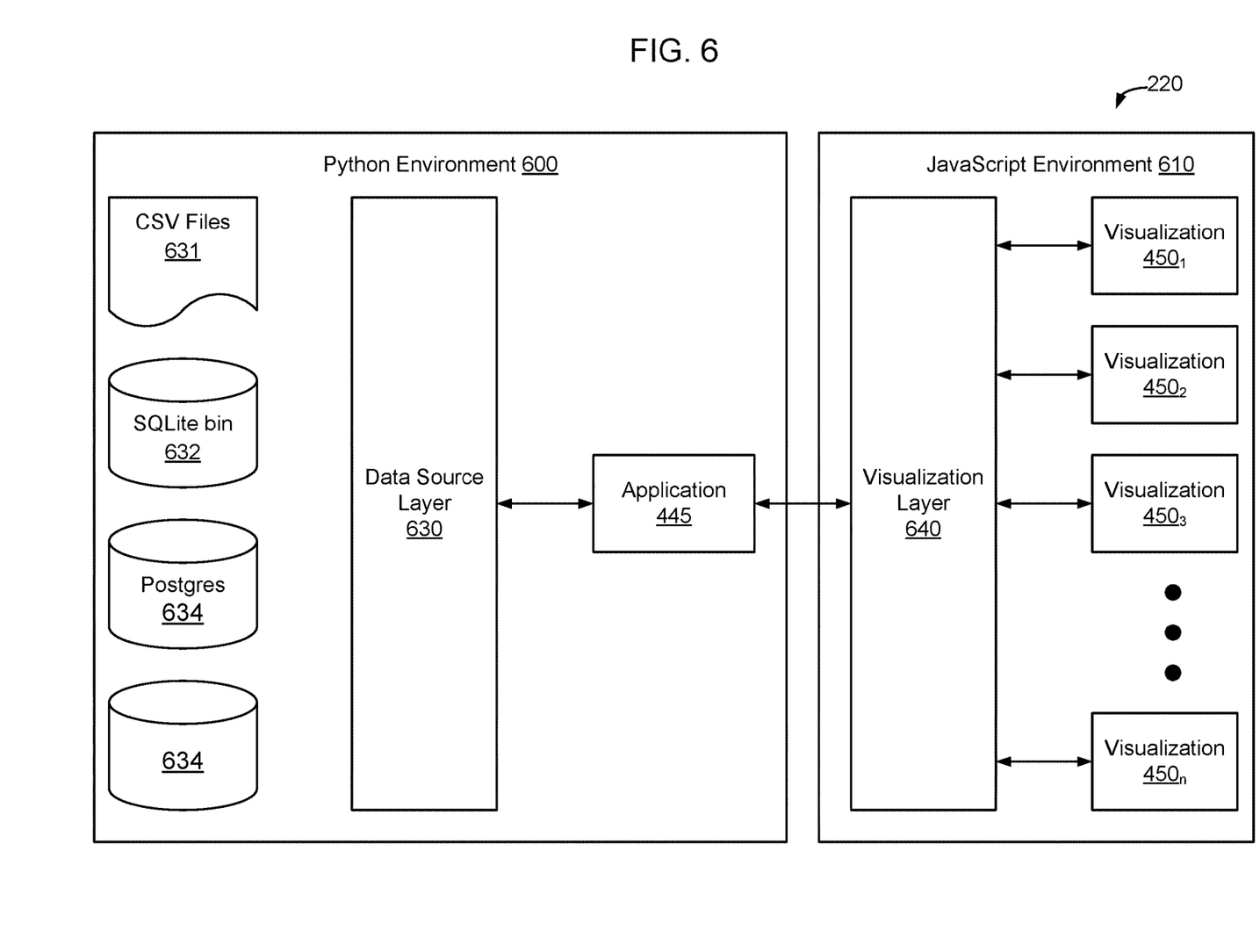
FIG. 6 is a functional block diagram showing the analytics dashboard application of the analytics engine of FIG. 4 in greater detail, according to some embodiments.

The analytics dashboard application uses data 440 from the PostgreSQL historical database 435 alone or in connection with the autonomous field telemetry reports 400 to generate visualizations 450. As shown in FIG. 6, in some embodiments, the analytics dashboard application is implemented using a client server architecture with a JavaScript frontend, Flask webserver, and Python backend. Data access, data processing, and data manipulation is implemented using the Python backend, while data rendering is done using JavaScript on the front end.

FIG. 6 is a functional block diagram showing the analytics dashboard application of the analytics engine of FIG. 4 in greater detail, according to some embodiments. As shown in FIG. 6, in some embodiments the analytics dashboard application 445 is implemented as web application on a webserver implementing a python environment 600. To access the analytics dashboard application 445, a browser loads a webpage including a JavaScript environment 610. The JavaScript defines a visualization layer 640 that interacts with application 445 to request visualizations 450 to be displayed. The application 445 interacts with a data source layer 630 in the python environment 600, and the data source layer 630 retrieves the required data from one or more data sources, such as CSV files 631, SQLite bin database 632, a PostgreSQL database 633, or directly from one of the storage systems 100 (shown using reference number 634) to generate the visualizations. Multiple sources of data (631-634) and possibly other data sources can be accessed by the data source layer, as discussed in greater detail below in connection with FIG. 7. The application 445 processes the data received from the data source layer 630 to generate the visualizations 4501-450n, and passes the visualizations back to the JavaScript environment 610 to be rendered for display by visualization layer 640.

Figure 7:
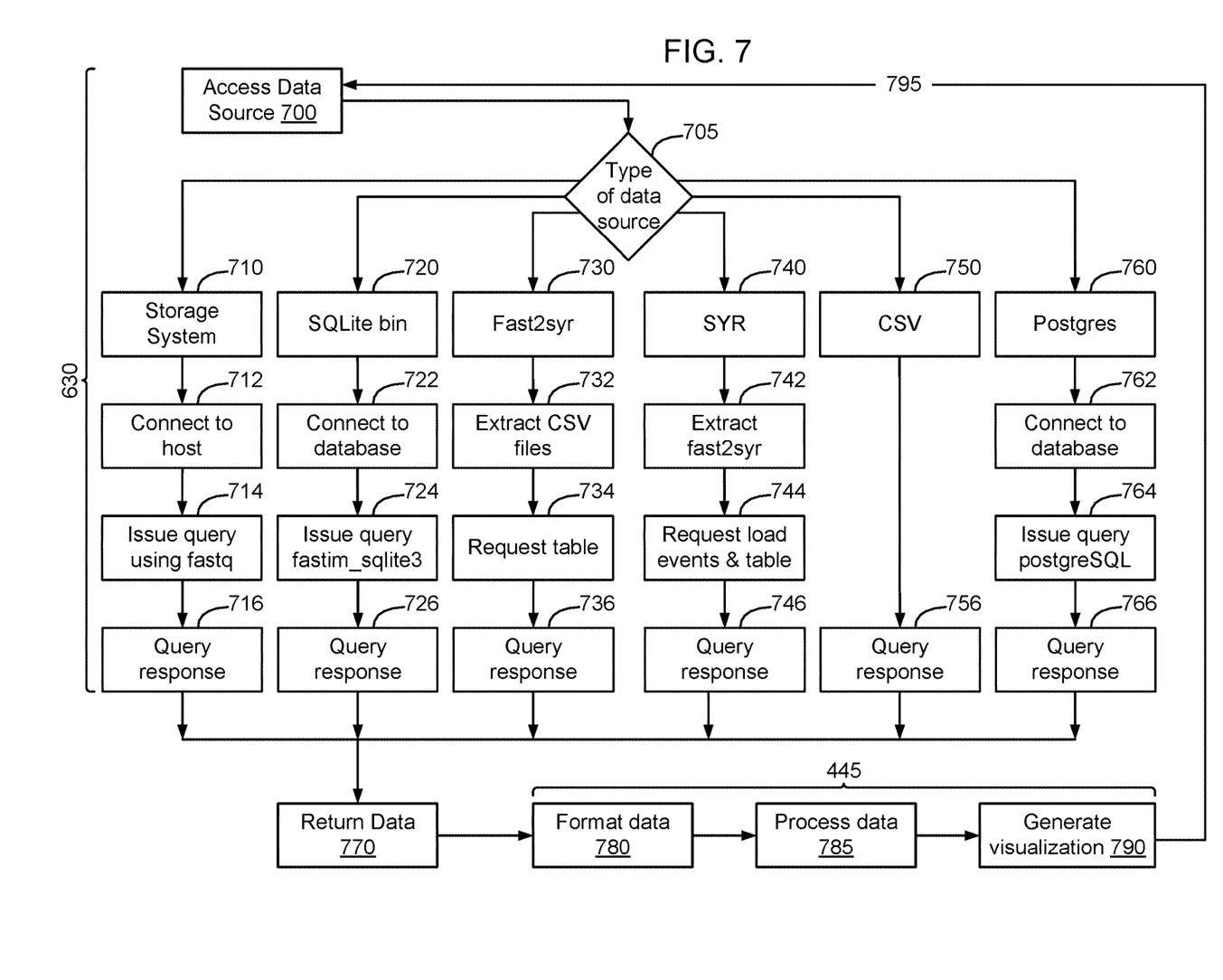
FIG. 7 is a flow chart of an example process implemented by the example analytics dashboard application of FIG. 6, according to some embodiments.

FIG. 7 is a flow chart of an example process implemented by the example analytics dashboard application 445 of FIG. 6, according to some embodiments. As shown in FIG. 7, the analytics dashboard application 445 starts creation of a visualization by sending a request to the data source layer 630 for access to a data source (block 700). In some embodiments, the analytics dashboard application 445 is able to process many types of data and, accordingly, the data source layer 630 has access to data of multiple types. The manner in which the data source layer processes the request of block 700 will depend on the source of data. Accordingly, the data source layer 630 parses the request to determine the type of the source of data (block 705).

If the type of data is determined, in block 705, to be live data from a storage system (block 710), the data source layer 630 connects to a Linux host zoned to the selected storage system (block 712). A query is then issued for example using fastq (block 714) and a query response is then read from the selected storage system 100 to the data source layer 630 (block 716).

If the type of data is determined, in block 705, to be SQLite bin data (block 720), the data source layer 630 connects to a SQLite database (block 712). A query is then issued for example using fastsim_sqlite3 (block 724) and a query response is then read to the data source layer 630 (block 726).

If the type of data is determined, in block 705, to be a fast2syr data source (block 730), the data source layer 630 extracts the CSV (Comma Separated Value) files (block 732) and requests the required table (block 734). The requested CSV table is then read to the data source layer 630 (block 736).

If the type of data is determined, in block 705, to be a SYR data source (block 740), the data source layer 630 extracts a fast2syr file (block 742). The data source layer 630 then issues a load event for the fast2syr file and requests a CSV table from the fast2syr file (block 744). The requested CSV table is then read to the data source layer 630 (block 746).

If the type of data is determined, in block 705, to be a CSV file (block 750), the data source layer 630 accesses the CSV file 631, and the requested CSV table is then read to the data source layer 630 (block 756).

If the type of data is determined, in block 705, to be a PostgresSQL database (block 760), the analytics dashboard application 445 connects to the PostgresSQL database (block 762), issues a query on the PostgresSQL database, e.g. using a Python library (block 764), and the returned query response is then read to the data source layer 630 (block 766).

Regardless of the source of the data, at block 770 the data source layer 630 reads the requested data out to the analytics dashboard application 445. The returned data is formatted by the analytics dashboard application 445 (block 780), processed by the analytics dashboard application 445 (block 785) and used by the analytics dashboard application 445 to create a visualization (block 790). If additional visualizations are required, or if additional data is required for the given visualization, the analytics dashboard application 445 submits another data request (arrow 795) and the process repeats. In some embodiments, example visualizations include scatter plots, bar charts, tabular displays, pie charts, and other graphical representations of data.

Figure 8:
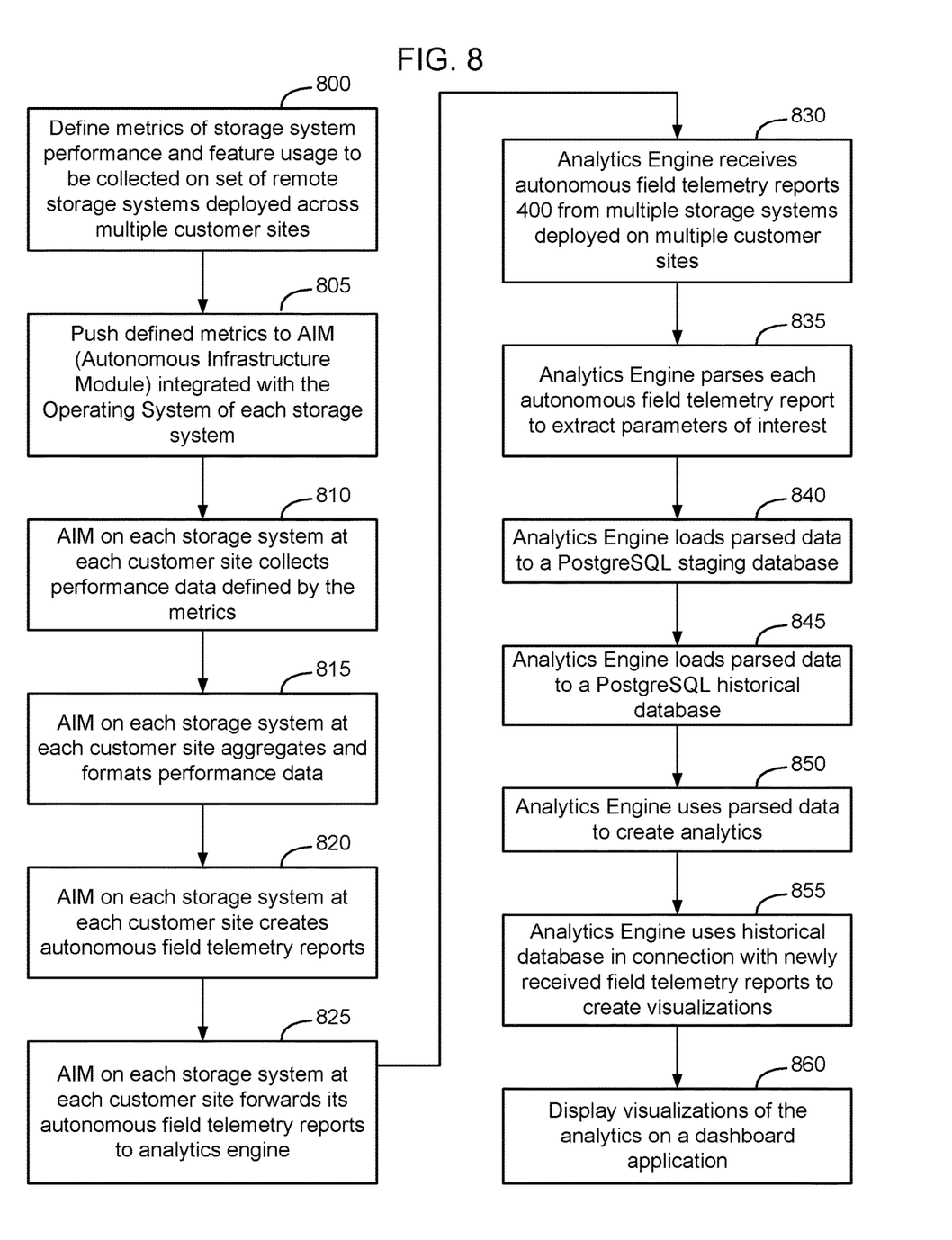
FIG. 8 is a flow chart of an example method of determining feature usage on a set of storage systems deployed across multiple customer sites, according to some embodiments.

FIG. 8 is a flow chart of an example method and apparatus for gathering and analyzing feature usage data of storage systems deployed across multiple customer sites, according to some embodiments. As shown in FIG. 8, in some embodiments the method includes defining metrics of storage system performance and feature usage to be collected on a set of remote storage systems deployed across multiple customer sites (block 800). The defined metrics are then pushed, for example from the analytics engine 220, to the autonomous infrastructure module 210 integrated with the operating system of each of the storage systems (block 805).

The autonomous infrastructure module 210 on each storage system at each customer site collects performance data and feature usage information from field telemetry data as defined by the metrics (block 810). The autonomous infrastructure module 210 on each storage system at each customer site aggregates and formats the performance data to reduce the amount of data that must be transmitted back to the analytics engine 220 (block 815). Using this aggregated information, the autonomous infrastructure module 210 creates autonomous field telemetry reports 400 (block 820). The autonomous field telemetry reports 400 are periodically forwarded by the autonomous infrastructure module 210 on communication network 240 to the analytics engine 220 (block 825).

The analytics engine 220 receives the autonomous field telemetry reports 400 from multiple storage systems deployed on multiple customer sites (block 830). Each field telemetry report 400 that is received, is parsed by the analytics engine to extract parameters of interest (block 835). The analytics engine 220 loads the parsed data to a PostgreSQL staging database 425 (block 840) and from there loads the parsed data to a PostgreSQL historical database 435 (block 840). The analytics engine 220 uses the parsed data to create analytics (block 850) and likewise uses the parsed data in the historical database 435 in connection with newly received field telemetry reports 400 to create visualizations (block 855). The visualizations are displayed on a dashboard application (block 860).

By collecting defined data metrics from a universe of deployed storage systems owned and operated by multiple different clients, aggregating the defined data in a dispersed manner, consolidating the data from the multiple storage systems and displaying the consolidated aggregated data, it is possible to gain insight as to how the collection of storage systems, as a whole, are collectively operating. Rather than simply looking at the operational characteristics of one particular storage system in isolation, it is possible to compare operational characteristics of one particular storage system against operational characteristics of a group of similar storage systems deployed at other customer sites, for example to diagnose misconfiguration of the particular storage system or to determine how configuration changes to the particular storage system would be expected to affect performance.

Likewise, when a new feature is created or a new capability is deployed to the set of storage systems, the usefulness of the feature is able to be ascertained by collecting metrics about the use of the new feature and enabling those metrics to be aggregated over time. If use of the new feature increases over time, it can be inferred that the new feature is gaining acceptance in the set of deployed storage systems. If use of the new feature abruptly decreases, it can be inferred that the new feature has one or more faults that is impeding its use. If usage of the new feature is prevalent at some customers but not prevalent at other customers, it can be inferred that additional training or support may be warranted for the customers that are not using the new feature to enable those customers to learn the benefits of the new feature and how to properly configure their storage systems to take advantage of the new feature.

Obtaining access to operational data of a universe of deployed storage systems owned by different customers, and enabling that data to be processed locally, enables insight into the operation of these storage systems to be determined. By providing an autonomous infrastructure module 210 in the operating system of the storage system with a global memory interface 330 that is able to monitor use of global memory, it is possible to monitor multiple types of actions that are derivable from the field telemetry data of the storage system. Further, by monitoring for specified types of operations on the storage systems, locally aggregating these operations, and then providing period field telemetry reports of the occurrence of the specified types of operations, it is possible to obtain information from each of the storage systems, rather than simply obtaining information from one particular storage system.

Having this information enables developers to debug their functionality in-house or easily triage customer systems in the field. The information also provides insight to developers to evaluate their functionality usage by customers, and offers knowledge of unique customer environments that can improve testing efforts. The information also allows data to be modeled for predictive analysis, to show customers the advantage/improvement the functionality has delivered.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of determining feature usage on a set of storage systems deployed across multiple customer sites, comprising:

installing an autonomous infrastructure module into a respective operating system (OS) of each storage system of the set of storage systems, each storage system having a respective global memory;

defining a metric related to a feature of interest, the metric specifying a type of operation by the OS on global memory that is to be identified and collected by each of the autonomous infrastructure modules;

pushing the defined metric to each autonomous infrastructure module;

monitoring, by each respective autonomous infrastructure module, respective OS operations on the respective global memory on each respective storage system;

processing the monitored respective OS operations, by each respective autonomous infrastructure module, using the defined metric to determine feature usage information of the storage system from the monitored OS operations on the respective global memory of the respective storage system;

aggregating, by each autonomous infrastructure module, the determined feature usage information of the respective storage system;

forwarding, by each respective autonomous infrastructure module, a respective field telemetry report with the aggregated feature usage information; and consolidating, by an analytics engine, the field telemetry reports to create a visualization of the feature usage across the set of storage systems deployed across multiple customer sites, wherein the step of aggregating comprises monitoring, by a set of aggregation modules of each of the autonomous infrastructure modules, aspects of telemetry data processed through the respective global memory and related to the features of interest; and wherein the aggregation modules are machine learning models trained to look for particular patterns in the telemetry data associated with the features of interest.

2. The method of claim 1, wherein each autonomous infrastructure module includes a global memory interface.

3. The method of claim 1, wherein the autonomous infrastructure module includes an API (Application Programming Interface), and wherein the step of pushing the defined metric to each autonomous infrastructure module is implemented via the API.

4. The method of claim 3, wherein the metric is active data movement, and wherein the autonomous interface module includes an active data movement module.

5. The method of claim 1, wherein a first of the set of aggregation modules of the autonomous infrastructure module is an active data movement aggregation module configured to monitor for and aggregate operations of the storage system that are associated with active movement of data by the storage system.

6. The method of claim 5, wherein active movement of data by the storage system comprises movement of data in connection with creation of snapshot point in time copies of data or mirroring of data between storage systems.

7. The method of claim 1, wherein a first of the set of aggregation modules of the autonomous infrastructure module is a load balancing module configured to monitor for and aggregate operations of the storage system associated with load balancing operations of the storage system between storage engines, storage arrays, CPUs, and other physical components of the storage system.

8. The method of claim 1, wherein a first of the set of aggregation modules of the autonomous infrastructure module is a QOS (Quality of Service) throttling aggregation module configured to monitor for and aggregate operations of the storage system associated with QOS throttling.

9. The method of claim 1, wherein a first of the set of aggregation modules of the autonomous infrastructure module is a federated storage tiering module configured to monitor for and aggregate operations of the storage system associated with movement of data between tiers of storage in a tiered storage system.

10. The method of claim 1, wherein a first of the set of aggregation modules of the autonomous infrastructure module is a compression module configured to monitor for and aggregate operations of the storage system associated with use of compression in connection with storage operations.

11. The method of claim 1, wherein a first of the set of aggregation modules of the autonomous infrastructure module is a disk health modeling module configured to monitor for and aggregate operations of the storage system associated with disk health parameters.

12. The method of claim 1, wherein each of the field telemetry reports contains a summary of telemetry data on the respective storage system related to the features of interest without requiring the actual telemetry data to be transmitted outside the storage system.

13. The method of claim 1, further comprising the steps of parsing received field telemetry reports by a data injestor and loading the parsed field telemetry reports by the data injestor to a database.

14. The method of claim 13, wherein the step of consolidating, by an analytics engine, comprises accessing multiple parsed field telemetry reports from the database.

15. The method of claim 1, wherein the step of consolidating, by an analytics engine, comprises accessing parsed field telemetry reports of multiple file types.

16. The method of claim 15, wherein the multiple file types include CSV (Comma Separated Value) files, SQLite bin data from a SQLite database, and Postgres files from a PostgresSQL database.

17. The method of claim 15, wherein the step of consolidating, by an analytics engine, further comprises accessing data directly from one of the storage systems.

* * * * *